United States Patent
Jang

(10) Patent No.: US 9,617,880 B2
(45) Date of Patent: Apr. 11, 2017

(54) METHOD FOR DIAGNOSING LACK OF ENGINE OIL

(71) Applicant: Hyundai Motor Company, Seoul (KR)

(72) Inventor: Hwa Yong Jang, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/931,572

(22) Filed: Nov. 3, 2015

(65) Prior Publication Data

US 2017/0022860 A1    Jan. 26, 2017

(30) Foreign Application Priority Data

Jul. 23, 2015    (KR) .......................... 10-2015-0104574

(51) Int. Cl.
| | |
|---|---|
| *F02D 41/22* | (2006.01) |
| *F01M 11/12* | (2006.01) |
| *F16H 57/04* | (2010.01) |

(52) U.S. Cl.
CPC ............. *F01M 11/12* (2013.01); *F02D 41/22* (2013.01); *F02D 41/222* (2013.01); *F16H 57/0447* (2013.01); *F16H 57/0449* (2013.01); *F02D 2041/228* (2013.01); *F16H 57/04* (2013.01)

(58) Field of Classification Search
CPC ....... F01M 11/12; F02D 41/22; F02D 41/222; F02D 2041/228; F16H 57/0449; F16H 57/0447; F16H 57/04
USPC ............... 701/102; 123/1 A; 340/450.3, 450; 184/103.1; 180/65.21
See application file for complete search history.

(56) References Cited

U.S. PATENT DOCUMENTS

| | | | |
|---|---|---|---|
| 2013/0118593 A1 | 5/2013 | Wright | |
| 2013/0131913 A1* | 5/2013 | Chae | F01M 11/12 |
| | | | 701/29.5 |
| 2015/0258885 A1* | 9/2015 | Ideshio | B60K 6/44 |
| | | | 180/65.225 |

FOREIGN PATENT DOCUMENTS

| | | |
|---|---|---|
| KR | 10-1996-0033865 A | 10/1996 |
| KR | 20-1999-0026732 U | 7/1999 |
| KR | 10-2003-0006114 A | 1/2003 |
| KR | 10-2005-0042668 A | 5/2005 |
| KR | 10-2010-0058164 A | 6/2010 |
| KR | 10-2011-0062010 A | 6/2011 |
| KR | 10-2014-0033167 A | 3/2014 |
| KR | 10-2014-0070746 A | 6/2014 |
| KR | 10-2014-0079619 A | 6/2014 |
| KR | 10-1406663 B1 | 6/2014 |

OTHER PUBLICATIONS

Korean Office Action issued on Jul. 26, 2016 in regard to the corresponding Korean patent application Korean patent application No. 10-2015-0104574.

* cited by examiner

*Primary Examiner* — Mahmoud Gimie

(74) *Attorney, Agent, or Firm* — McDermott Will & Emery LLP

(57) ABSTRACT

A method for diagnosing a lack of engine oil includes determining, by a controller, whether an oil level of an engine is normalized from an insufficient state to a normal state using an oil level switch. When it is determined that the oil level is normalized to the normal state, a driving mode of a vehicle is confirmed. When it is confirmed that the driving mode of the vehicle is an engine off driving mode, a diagnosis of the oil level is stopped.

11 Claims, 3 Drawing Sheets

METHOD FOR DIAGNOSING LACK OF ENGINE OIL

CROSS REFERENCE TO RELATED APPLICATION

The present application claims the benefit of priority to Korean Patent Application No. 10-2015-0104574, filed on Jul. 23, 2015, the entire content of which is incorporated herein for all purposes by this reference.

TECHNICAL FIELD

The present disclosure relates to a method for diagnosing a lack of engine oil depending on a driving mode of a vehicle.

BACKGROUND

In general, a vehicle uses engine oil for lubrication to smoothly maintain a reciprocating motion of a piston performed in response to an explosion in an engine, for sealing to prevent pressure from being leaked, for anticorrosion to absorb foreign matter in a cylinder to prevent an inner wall of the cylinder from being damaged, and for cooling to absorb heat from the cylinder and the piston.

The engine oil having the above functions is combusted by explosion in the engine over long term use, and thus, the amount of the engine oil may be reduced and the engine oil may deteriorate, such that viscosity, a total acid number, and a sludge amount of the engine oil may change.

Therefore, the engine oil needs to be periodically replenished or exchanged. However, when a vehicle is driving in a state when the oil should be replenished and exchanged, durability of each lubricating part may be degraded, such that engine life and engine output may be reduced. In particular, environmental problems may occur due to excessive fuel consumption and an increased amount of exhaust gas.

To solve the above problems, the related art has used an oil level switch. The oil level switch detects the storage amount of lubricating oil of an engine and informs the user of the detected storage amount of the lubricating oil.

In a case of a hybrid diesel engine, when a driving mode of a vehicle is a hybrid driving mode, the engine is turned off in an ignition on (IG ON) state.

If the oil level switch detects a lack of oil while the driving mode is an engine driving mode and performs a fault diagnose, the vehicle changes to the hybrid driving mode and the engine stops running. Thus, the oil moves back to a lower portion of an oil pan of the engine even though the engine oil is not fully refilled. In this case, the oil level is misdiagnosed to be normal.

The contents described as the related art have been provided only for assisting in the understanding for the background of the present disclosure and should not be considered as corresponding to the related art known to those skilled in the art.

SUMMARY

An object of the present inventive concept is to accurately diagnose a lack of engine oil by performing a normalization determination of the engine oil depending on a driving mode of a vehicle, when it is determined that an oil level is normalized from an insufficient state to a normal state.

According to an exemplary embodiment of the present inventive concept, a method for diagnosing a lack of engine oil includes determining, by a controller, whether an oil level of an engine is normalized from an insufficient state to a normal state using an oil level switch. When it is determined that the oil level is normalized to the normal state, a driving mode of a vehicle is confirmed. When it is confirmed that the driving mode of the vehicle is an engine off driving mode, a diagnosis of the oil level is stopped.

When the oil level is insufficient, the controller may turn on an oil level warning light and maintain the oil level warning light in a turn-on state in the step of stopping the diagnosis.

In the step of determining whether the oil level is normalized, it may be determined that the oil level is normalized when a turn-off signal of the oil level switch is continuously detected over a set period of time.

In the step of determining whether the oil level is normalized, it may be determined that the oil level is normalized when a value obtained by dividing an accumulated time in which the turn-off signal of the oil level switch is detected from a time in which the lack of the engine oil is diagnosed up to the current time by a total accumulated time up to the current time is equal to or more than a reference value.

The method may further include diagnosing that the oil level is normalized when it is confirmed that the driving mode of the vehicle is an engine on driving mode.

In the step of diagnosing the oil level, the oil level warning light may be turned off.

The method may further include confirming whether the vehicle satisfies oil level diagnosis conditions. The step of determining whether the oil level is normalized may be performed only when the oil level diagnosis conditions are satisfied.

One of the oil level diagnosis conditions may be satisfied when a driving distance is equal to or more than a reference distance.

One of the oil level diagnosis conditions may be satisfied when an end of line (EOL) fault diagnosis is completed.

One of the oil level diagnosis conditions may be satisfied when an injector correction code is input.

The engine off driving mode may include an electric vehicle (EV) mode and a hybrid driving mode.

DETAILED DESCRIPTION

Hereinafter, a method for diagnosing a lack of engine oil according to exemplary embodiments of the present inventive concept will be described with reference to the accompanying drawings.

Figure 1:
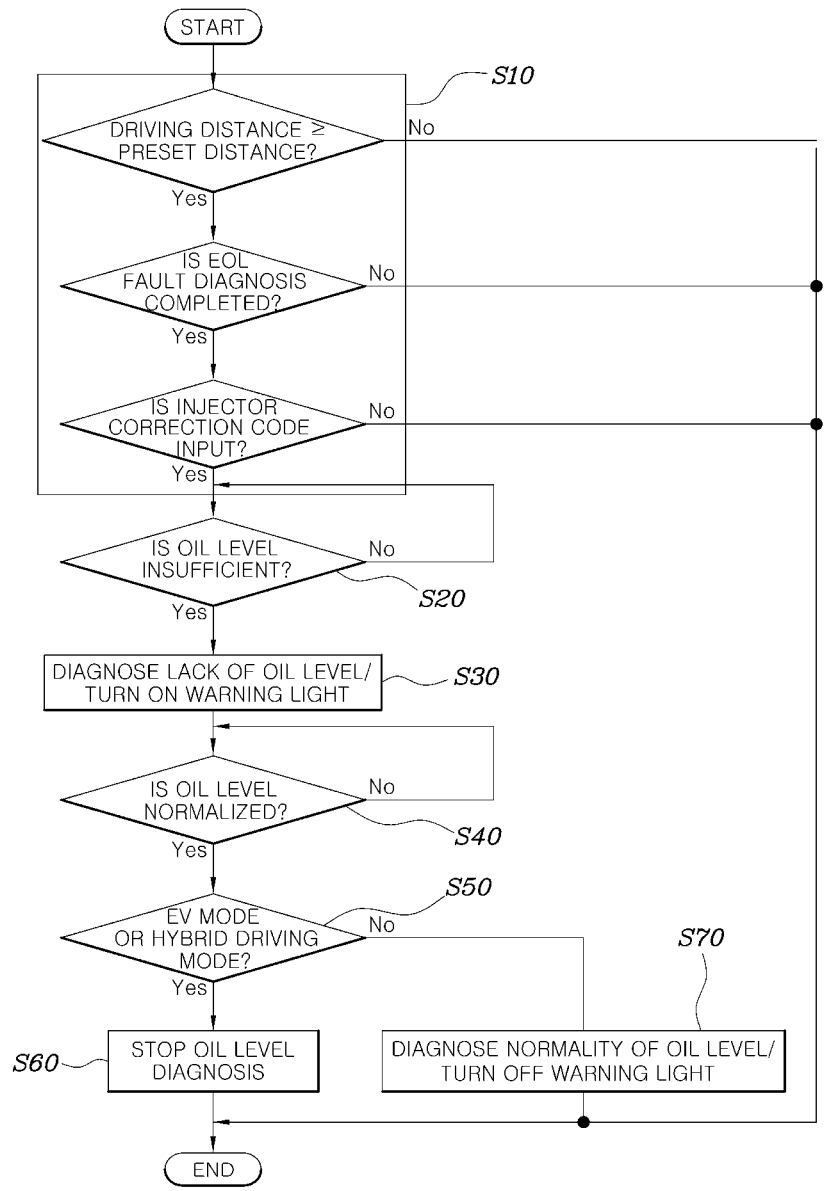
FIG. 1 is a flow chart illustrating a method for diagnosing a lack of engine oil according to an exemplary embodiment of the present inventive concept.
Figure 2:
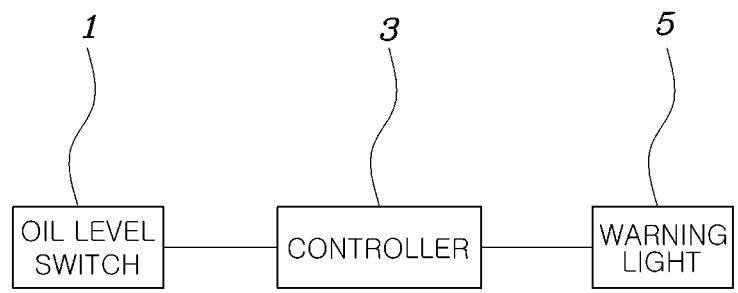
FIG. 2 is a block diagram illustrating an apparatus for diagnosing a lack of engine oil according to an exemplary embodiment of the present inventive concept.

FIG. 1 is a flow chart illustrating a method for diagnosing a lack of engine oil according to an exemplary embodiment of the present inventive concept. FIG. 2 is a block diagram illustrating an apparatus for diagnosing a lack of engine oil according to an exemplary embodiment of the present inventive concept.

Referring to FIGS. 1 and 2, a method for diagnosing a lack of engine oil may include determining, by a controller 3, whether an oil level of an engine is normalized from an insufficient state to a normal state using an oil level switch 1 (S40). When it is determined in step S40 that the oil level is in the normal state, a driving mode of a vehicle is confirmed (S50). When it is confirmed in step S50 that the driving mode of the vehicle is an engine off driving mode, a diagnosis on the oil level is stopped (S60).

The controller 3 may be an electronic control unit (ECU) and may detect whether the engine oil is insufficient or normal using the oil level switch 1.

In detail, when the engine oil is insufficient, the oil level switch 1 allows a magnetic floater to move down along the oil level, thereby making a plurality of lead switches to be spaced from each other. Therefore, the controller 3 may detect an insufficient state of the engine oil based on a contact state of the plurality of lead switches included in the oil level switch 1.

When the oil level is normalized again, the plurality of lead switches contact each other while the floater moves up along the oil level. In this case, the controller 3 may determine that the oil level is normal.

According to the present disclosure, the method may further include diagnosing the lack of the engine oil using the oil level switch 1 (S20, S30) and then determining that the engine oil is normalized back to the normal state. The controller 3 determines whether the actual engine oil is replenished or the oil level is determined to be in the normal state even though the engine oil is not replenished, thereby improving reliability of the diagnosis on the oil level. The detailed method thereof will be described below.

The hybrid vehicle may include various driving modes. Among these, the engine stops in an engine off driving mode. For example, the engine is turned off in an electric vehicle (EV) mode or a hybrid driving mode. In the EV mode or the hybrid driving mode, the engine is turned off in an ignition on (IG ON) state.

When the driving mode of the vehicle is the EV mode or the hybrid driving mode, the engine oil at an upper portion of the engine may move to a lower portion of an oil pan while the engine is turned off to determine that the oil level is normal. Therefore, when the driving mode of the vehicle is the EV mode or the hybrid driving mode, even though the engine oil is not refilled, misdiagnosis of the oil level may occur. In this case, the diagnosis on the oil level may stop to prevent the misdiagnosis of the oil level.

When the oil level is insufficient, the controller 3 turns on an oil level warning light 5 and maintains the oil level warning light 5 in a turn-on state in step S60.

When it is sensed that the amount of the engine oil in the engine is insufficient, the oil level warning light 5 is turned off. In this case, a driver detects that the engine oil is insufficient to charge the engine oil.

When the driver refills the engine oil, the controller 3 may detect normalization of the oil level using the oil level switch 1 to turn off the oil level warning light 5. However, as described above, when the vehicle is driving in the engine off driving mode, the diagnosis of the oil level stops, and therefore, the oil level warning light 5 may be maintained in the turn-on state. Therefore, the driver may continuously detect the insufficient state of the engine oil.

In step S40, the controller 3 may determine that the oil level is normalized when a turn-off signal of the oil level switch 1 is continuously detected over a set period of time. That is, since the engine oil is not maintained at a constant oil level but is changed depending on driving conditions such as a road surface state, a driving state, etc., separate conditions for sensing normalization of the oil level are required.

Figure 3:
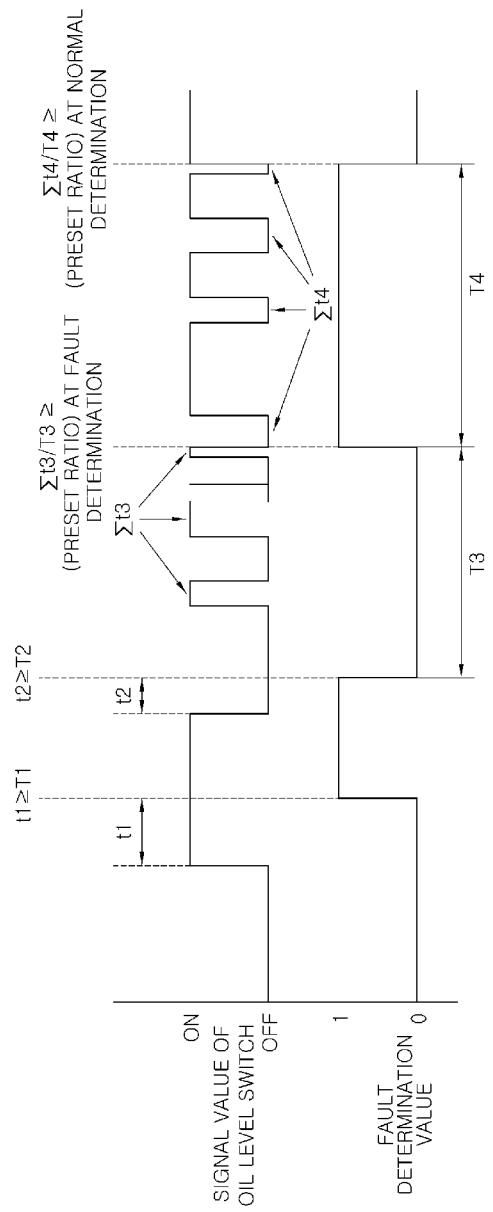
FIG. 3 is a graph illustrating an insufficient/normal determination of an oil level according to an exemplary embodiment of the present inventive concept.

FIG. 3 is a graph illustrating a lack of/normal determination of an oil level according to an exemplary embodiment of the present inventive concept. Referring to FIG. 3, when the turn-off signal generated by contacting lead switches in the oil level switch 1 again is continuously maintained over time T2, it may be determined that the oil level is normalized.

As another embodiment, in step S40, the controller 3 may determine that the oil level is normalized when a value obtained by dividing an accumulated time in which the turn-off signal of the oil level switch 5 is detected from a time point when the lack of the engine oil is diagnosed up to the current time by a total accumulated time up to the current time is equal to or more than a reference value.

Referring to FIG. 3, the controller 3 may determine that the oil level is normalized when a value obtained by dividing an accumulated time $\Sigma t4$ in which the turn-off signal of the oil level switch 5 is generated from a time point when the lack of the engine oil is diagnosed up to the current time by a total accumulated time T4 which ranges from a diagnosis time point of the lack of the engine oil up to the current time is equal to or more than a reference value. According to the comparison result, it is possible to accurately determine the normalization of the oil level.

Further, the lack state of the oil level may be appreciated from FIG. 3. That is, when a logic of diagnosing the lack of the oil level is performed (S20), the controller 3 may diagnose that the oil level is insufficient if turn-on signal of the oil level switch 1 is kept over a preset time T1 or if a value obtained by dividing time $\Sigma t3$ when the turn-on signal of the oil level switch 1 is accumulated by a total accumulated time T3 is equal to or more than a reference value (S30).

Based on the result of step S50, the method may further diagnose that the oil level is normalized (S70) when the driving mode of the vehicle is an engine on driving mode in which the engine is on.

That is, based on the result of step S50 by determining that the oil level is normalized, the controller 3 may diagnose that the oil level is normalized to the normal state by determining that the engine oil is replenished when the vehicle is the engine on driving mode.

In this case, in step S70, the driver may recognize that refill of the engine oil is no longer required after the engine oil is refilled by the oil level warning light 5 turning off.

The controller 3 confirms whether the vehicle satisfies an oil level diagnosis conditions at an initial stage of the diagnosis (S10) may perform step S40 only when the oil level diagnosis conditions are satisfied The oil level diagnosis conditions are satisfied when a driving distance is equal to or more than a reference distance and an end of line (EOL) fault diagnosis is completed, and an injector correction code is input. That is, the oil level fault diagnosis may not be performed by determining the situation that the oil level diagnosis conditions are unsatisfied during a manufacturing or releasing process of the vehicle.

According to the method for diagnosing a lack of engine oil, it is possible to improve reliability by accurately diagnosing the oil level depending on the driving mode of the vehicle.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A method for diagnosing a lack of engine oil, the method comprising:
   determining, by a controller, whether an oil level of an engine is normalized from an insufficient state to a normal state using an oil level switch;
   confirming a driving mode of a vehicle, when it is determined that the oil level is normalized to the normal state; and
   stopping a diagnosis of the oil level, when it is determined that the driving mode is an engine off driving mode.

2. The method of claim 1, wherein when the oil level is insufficient, the controller turns on an oil level warning light and maintains the oil level warning light in a turn-on state during the stopping the diagnosis.

3. The method of claim 1, wherein in the step of determining whether the oil level is normalized, it is determined that the oil level is normalized when a turn-off signal of the oil level switch is continuously detected over a set period of time.

4. The method of claim 1, wherein in the step of determining whether the oil level is normalized, it is determined that the oil level is normalized when a value obtained by dividing an accumulated time in which a turn-off signal of the oil level switch is detected from a time point when the lack of the engine oil is diagnosed up to the current time by a total accumulated time up to the current time is equal to or more than a reference value.

5. The method of claim 1, further comprising:
   diagnosing that the oil level is normalized when it is confirmed that the driving mode of the vehicle is an engine on driving mode in which the engine is running.

6. The method of claim 5, wherein in the step of diagnosing that the oil level is normalized, an oil level warning light is turned off.

7. The method of claim 1, further comprising:
   confirming whether the vehicle satisfies oil level diagnosis conditions,
   wherein the step of determining whether the oil level is normalized is performed only when the oil level diagnosis conditions are satisfied.

8. The method of claim 7, wherein one of the oil level diagnosis conditions is satisfied when a driving distance is equal to or more than a reference distance.

9. The method of claim 7, wherein one of the oil level diagnosis conditions is satisfied when an end of line (EOL) fault diagnosis is completed.

10. The method of claim 7, wherein one of the oil level diagnosis conditions is satisfied when an injector correction code is input.

11. The method of claim 1, wherein the engine off driving mode includes an electric vehicle (EV) mode and a hybrid driving mode.

* * * * *